Sept. 11, 1945.　　　H. C. KRONE ET AL　　　2,384,627
SELF-CLOSING AND SLOW-CLOSING VALVE
Filed May 12, 1943　　　3 Sheets-Sheet 1

INVENTORS:
Howard C. Krone & William Meyer,
BY George L. Richards
ATTORNEY.

Sept. 11, 1945.    H. C. KRONE ET AL    2,384,627
SELF-CLOSING AND SLOW-CLOSING VALVE
Filed May 12, 1943    3 Sheets-Sheet 2

INVENTORS:
Howard C. Krone & William Meyer,
BY George L. Richards
ATTORNEY.

Sept. 11, 1945.    H. C. KRONE ET AL    2,384,627
SELF-CLOSING AND SLOW-CLOSING VALVE
Filed May 12, 1943    3 Sheets-Sheet 3

INVENTORS:
Howard C. Krone & William Meyer,
BY George L. Richards
ATTORNEY.

Patented Sept. 11, 1945

2,384,627

UNITED STATES PATENT OFFICE 2,384,627

SELF-CLOSING AND SLOW-CLOSING VALVE

Howard C. Krone, River Edge, and William Meyer, East Orange, N. J., assignors to Wheaton Brass Works, Newark, N. J., a corporation of New Jersey Application May 12, 1943, Serial No. 486,648

3 Claims. (Cl. 251—132)

This invention relates to improvements in valves; and the invention has reference, more particularly, to an improved valve of the self-closing and slow-closing type.

The invention has for an object to provide a self-closing and slow-closing valve having in combination with its movable valve member a novel dash-pot means which is so arranged and constructed as to prevent substantial transmission of the pressure of liquid in the liquid delivery line, by which the valve is served, from exerting direct axial thrust upon the valve member in opposition to its opening movement, whereby the latter may be quickly and easily opened, no matter what the line pressure may be, and consequently all necessity for adjusting the valve control and closing means in accommodation to various line pressures is avoided; with the advantage that the valve may be as easily and quickly manipulated under various and variable line pressures, as it is when the liquid is merely delivered by gravity.

The invention has for another object to provide a self-closing and slow-closing valve having a novel dash-pot construction, the cylinder of which is carried directly upon the valve member so as to be movable therewith, and the plunger of which is stationary, being supported by and from the valve casing; thus isolating the dash-pot chamber and its content from the effects of pressure of liquid in the liquid delivery line by which the valve is served, and thus likewise eliminating axial thrust of said liquid pressure upon the valve member per se in opposition to its opening movement.

The invention has for a further object to provide a self-closing and slow-closing valve having a novel dash-pot construction as above characterized, including a single valveless liquid ingress and egress means operative to permit easy opening manipulation of the valve, but being effective to retard its self-closing movement so as to prevent sudden back pressure and consequent "water-hammer" in the liquid delivery line by which the valve is served. And another object of the invention is to provide variations of the dash-pot single valveless ingress and egress means respectively adapted for use in valves equipped with upwardly opening valve members and those equipped with downwardly opening valve members.

Other objects of this invention, not at this time more particularly enumerated, will be understood from the following detailed description of the same.

Illustrative embodiments of the invention are shown in the accompanying drawings, in which.

Similar characters of reference are employed in the above described views, to indicate corresponding parts.

Figure 1:
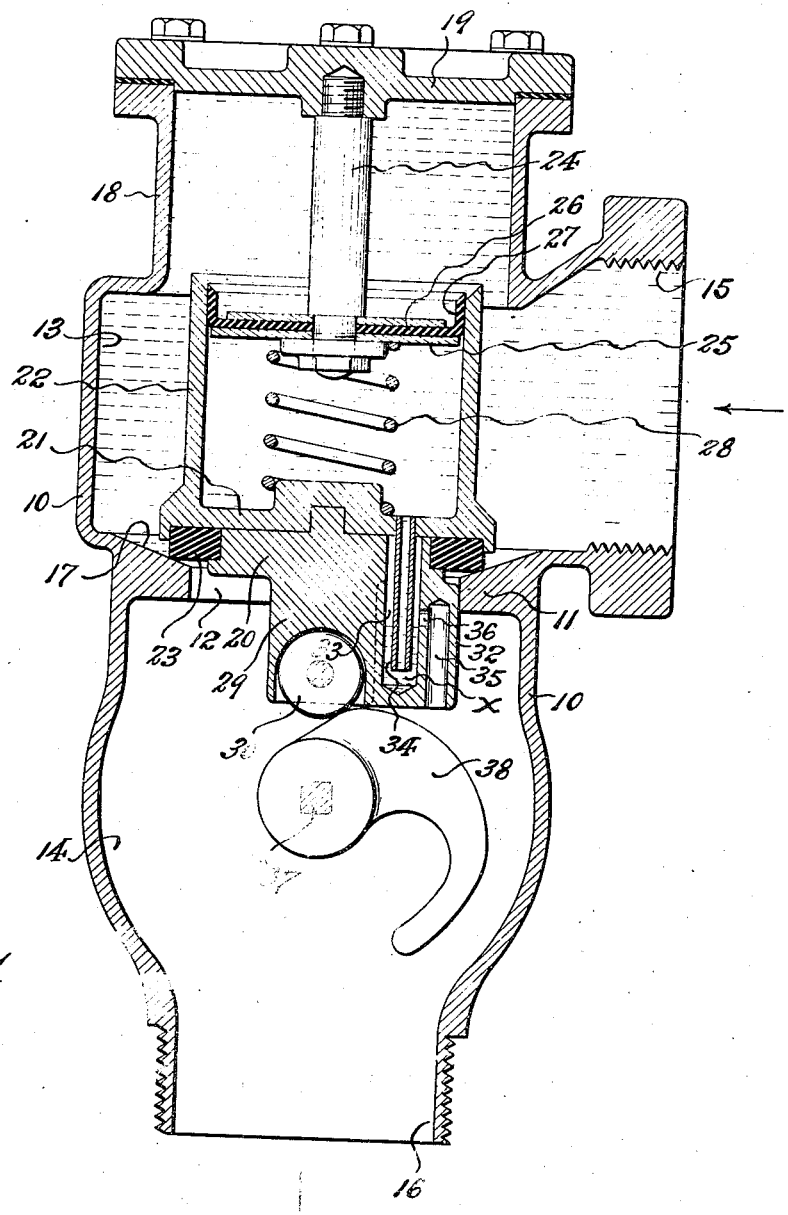
Fig. 1 is a longitudinal sectional view of a valve according to this invention equipped with an upwardly opening valve member, the latter being shown in closed position.
Figure 2:
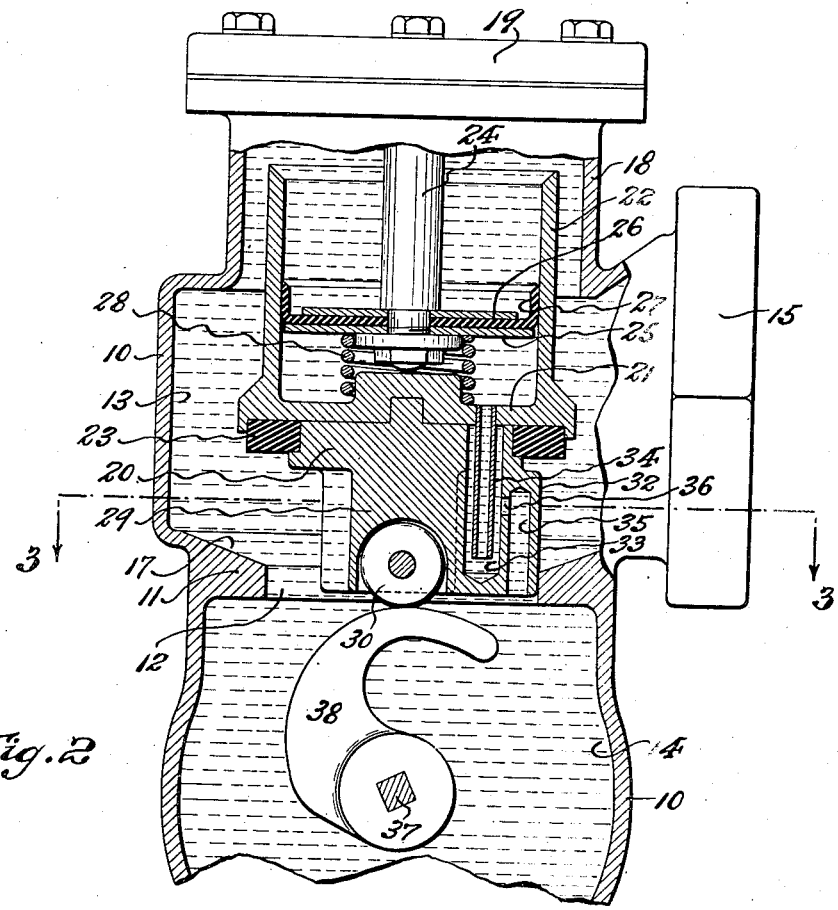
Fig. 2 is a fragmentary longitudinal sectional view of the same with its valve member shown in open position.
Figure 3:
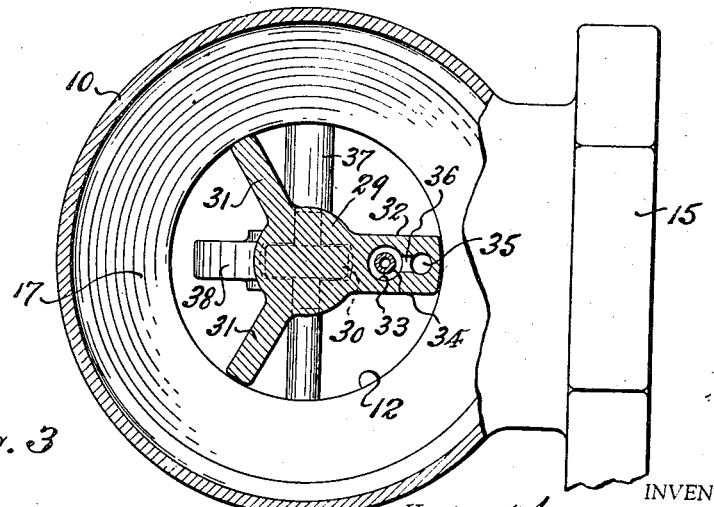
Fig. 3 is a horizontal sectional view, taken on line 3—3 in Fig. 2.

Referring to Figs. 1 to 3 inclusive, the form of valve therein shown comprises a valve casing or housing 10 of suitable shape, the interior of which is subdivided by a transverse partition 11 having formed therein a valve port 12, above which is the valve intake chamber 13, and below which is the valve outlet chamber 14. As shown, leading laterally into the intake chamber 13 is a suitably formed intake connection 15 to which a liquid delivery pipe (not shown) may be suitably coupled or joined; and leading axially from the outlet chamber 14 is a suitably formed discharge connection 16 to which a liquid discharge pipe (not shown) may be suitably coupled or joined. Formed on the upper side of the partition 11, and around the valve port 12 therein, is an annular chamfered valve seat 17.

Above and in communication with the valve intake chamber 13, to extend therefrom in axial alignment with the valve port 12 is an extension 18 of the valve body 10, which is open at its free end, but normally closed by a detachable cap plate 19 suitably secured thereto.

Cooperative with said valve port 12 and its valve seat 17 is the body 20 of an upwardly opening valve. Suitably affixed to the upper side of this valve body is the closed bottom 21 of an upwardly open dash-pot cylinder 22. Carried by the valve body 20 and said dash-pot cylinder 22, in suitably affixed relation thereto, is an annular valve member 23, the same being preferably made of a material or composition sufficiently soft to compress conformingly and sealingly to the valve seat 17, when the valve member is engaged therewith in valve port closing position.

Affixed to the cap plate 19, so as to depend therefrom in axial alignment with the dash-pot cylinder 22, is a supporting post 24 by which is supported a stationary piston or plunger 25. This piston or plunger 25 enters and fits within the upwardly open end of said dash-pot cylinder 22. Said piston or plunger includes a piston washer 26 of comparatively flexible material, having an upstanding peripheral skirt 27 to slidingly hug the walls of said dash-pot cylinder 22, so as to serve as a leak-proof seal between the latter and said piston or plunger. Arranged between the stationary piston or plunger 25 and the closed bottom of the dash-pot cylinder 22 is a compression spring 28 adapted to yieldably exert a downward thrust upon the dash-pot cylinder 22 and the valve body 20 joined thereto, whereby to move the valve body and its valve member 23 down upon the valve seat 17 and in closed relation to the valve port 12.

Dependent from the valve body 20, in axial extension therefrom, is a thrust stud 29 on the lower end of which is rotatably mounted an anti-friction roller 30. Projecting radially from the sides of said thrust stud 29 are guide ribs or flanges 31 and 32 which slidingly engage the margins of the valve port 12, so as to guide the axial opening and closing movements of the valve body 20 and its valve member 23.

The valve body and dash-pot cylinder structure is provided with a single valveless ingress and egress means which provides communication for liquid between the interior of the dash-pot cylinder 22 and the outlet chamber 14 of the valve. In a form thereof suitable for use with the upwardly opening valve body above described, said ingress and egress means is formed in the guide rib or flange 32, which is laterally enlarged for accommodation thereof. As thus located said ingress and egress means comprises an elongated chamber 33 formed in the valve body 20 and said guide rib or flange 32, the same being closed at its bottom end and also closed at its top end by the bottom wall of said dash-pot cylinder 22. Affixed to and extending through the bottom wall of said dash-pot cylinder 22, so as to communicate with the interior of the latter, is a tubular duct 34. This duct 34 extends downwardly into the chamber 33 to communicate with the interior thereof, and terminates short of its bottom end. Also formed in the guide rib or flange 32, parallel to but separate from the chamber 33, is an outlet passage 35 having a closed upper end but an open bottom end in communication with the outlet chamber 14 of the valve housing. The upper end of said outlet passage 35 communicates with the interior of the chamber 33 through a lateral way or port 36, which is located a substantial distance above the open bottom end of said tubular duct 34.

Means for opening the valve by manual operation comprises a spindle 37 journaled to extend transversely through the outlet chamber 14 of the valve housing. One end of said spindle projects exteriorly through a stuffing box (not shown) as is customary with valves of the kind to which this invention relates, and the exterior portion of the spindle is provided with wrench engageable or hand lever means (not shown) for manually rotating the same. Fixed on said spindle, so as to turn therewith, is a lift cam 38. Said lift cam, when rotated in a proper direction, is adapted to engage the anti-friction roller 30, whereby to impart an upward thrust upon the thrust stud 29, to thereby raise the valve body 20 and its valve member 23, and thus open the valve port 12 to outflow of liquid therethrough from the intake chamber 13 to and through the outlet chamber 14 (see Fig. 2).

As the valve body 20 is raised to valve port opening position, the dash-pot cylinder 22 moves upwardly therewith relative to the stationary piston or plunger 25, thus compressing the valve closing spring 28. Since the pressure of liquid in the liquid delivery line by which the valve is served, and in the valve intake chamber 13, is exerted externally upon the stationary piston or plunger 25, substantially no axially exerted force is opposed to the opening movement of the valve, and consequently the manual opening actuation of the valve is not materially resisted, except for the tension of the closing spring 28 and the discharge of liquid from the dash-pot cylinder interior, and therefore the valve may be easily and quickly opened regardless of what the liquid pressure at the intake side of the valve may be. This is of considerable advantage, not alone by reason of easing the manipulation of the valve, but also by reason of the fact that necessity for adjusting the valve control and closing means in accommodation to variations of liquid pressure is avoided.

When the valve is opened as described, the movement of the dash-pot cylinder toward the stationary piston or plunger 25 forces the liquid content of the former to seek egress through the ingress and egress means. In thus discharging from the dash-pot cylinder, the liquid passes outwardly through the duct 34 and into the chamber 33, in which it rises to pass thence through the port 36 into the outlet passage 35 for final discharge into the valve outlet chamber 14 through which liquid from the line, passing through the open valve port 12, is flowing from the supply line by which the valve is served.

When the valve is manually opened as described, it must be held open by the operator, for as soon as actuating force is released, the valve is self-closing under the reaction of the compressed closing spring 28. Under the closing thrust of the closing spring 28, which is purchased upon the stationary piston or plunger 25, the valve body and its valve member together with the dash-pot cylinder 22 is moved downwardly to carry the valve body and valve member to valve port closing position. As the dash-pot cylinder 22 moves away from the piston or plunger 25, suction effect is initiated and continued until relative movement is arrested by seating of the valve body and valve member in valve port closing position, whereby ingress of liquid to the dash-pot cylinder interior occurs. The liquid is drawn from the outlet chamber 14 inwardly through the outlet passage 35 into the chamber 33 by way of the port 36, to pass thence upwardly through the duct 34 into the dash-pot cylinder. Such ingress of liquid retards the closing movement of the valve sufficiently to prevent occurrence of sudden back pressure and resultant "water-hammer" in the liquid delivery line from which the valve is served.

Upon seating of the valve body and valve member in valve port closing position, the dash-pot cylinder is again filled with liquid (see Fig. 1). This liquid content of the dash-pot cylinder is retained against draining escape by reason of the form and arrangement of the ingress and egress passages, whereby the lower end of the duct 34 is submerged in and sealed by a pocket of liquid X, which is retained within the lower end of the chamber 33 below the level of the transverse port 36, and consequently entry of air through the duct 34 is prevented, and outward escape of liquid from the dash-pot cylinder is therefore likewise prevented. Such sealing of the dash-pot cylinder against outward draining of its contained liquid under gravity is required when the valve is so positioned in the liquid line served thereby that its outlet end is downwardly directed with its intake end upward, which arrangement involves an upwardly opening movable valve means for the valve port 12.

Figure 4:
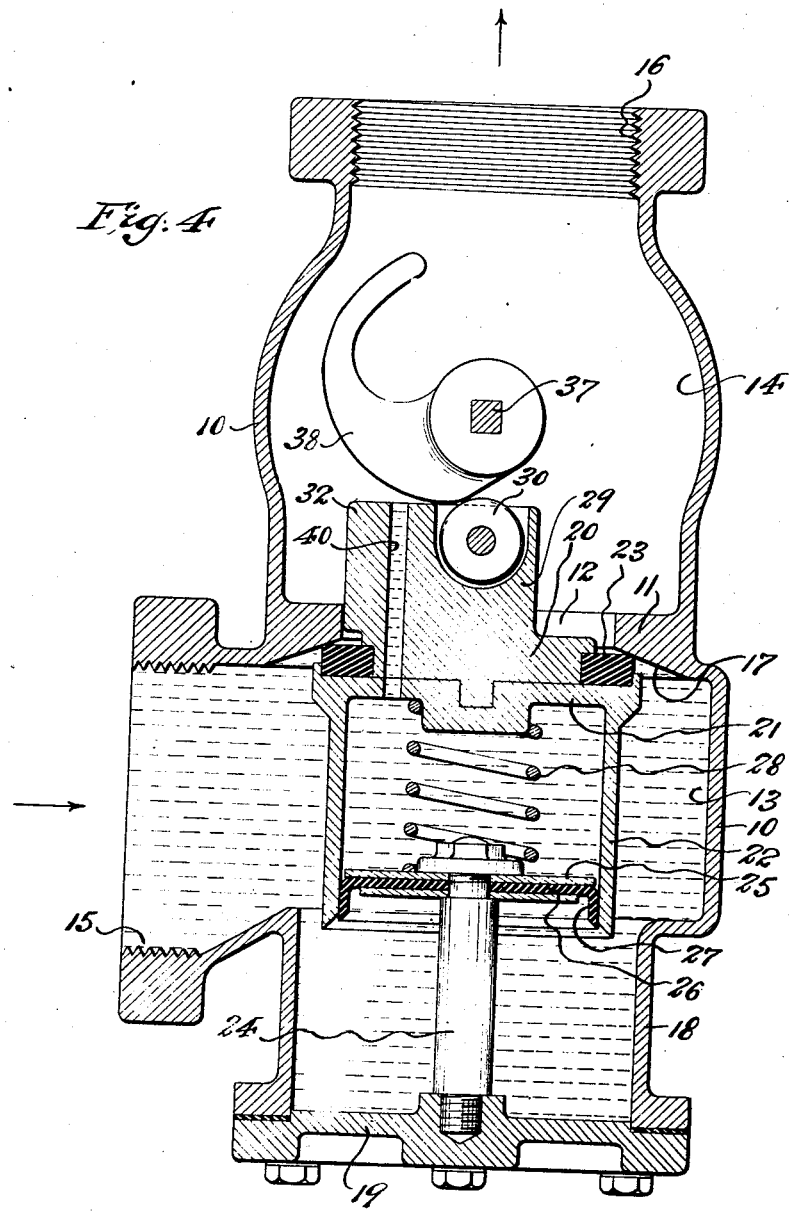
Fig. 4 is a longitudinal sectional view of a valve according to this invention equipped with a downwardly opening valve member, the latter being shown in closed position.

In some installations of the valve it may be desirable that its position in the line served thereby be reversed viz. so disposed that its outlet end is upwardly directed and its intake end downward (see Fig. 4). Such reversed disposition of the valve requires no radical change in its construction from that above described, but by reason of the fact that in such position its movable valve structure is of downwardly opening arrangement, the form of the single valveless ingress and egress means serving the dash-pot cylinder may be simplified, and reduced to a single passage 40 formed in a guide rib or flange, instead of the compound liquid sealable passage above described. This is possible by reason of the fact that the reversed position of the dash-pot cylinder 22 disposes the ingress and egress means in upwardly directed disposition, so that draining away under gravity of the liquid content of said dash-pot cylinder cannot occur. In operation, however, so far as discharge of liquid from the dash-pot cylinder under opening movement of the movable valve structure and retardation of the latter during closing movement thereof by ingress of liquid to the dash-pot cylinder is concerned, there is no radical difference in function or performance.

It will be noted that the ingress and egress means constitutes a continuously open single path of movement for both inward and outward flow of liquid to and from the dash-pot cylinder, as given directions of valve structure movement may require. For this reason, there is no necessity for provision of a plurality of independent passages, such as one continuously open and one normally closed but adapted to open on main valve opening movement, or of mechanical check or adjustable auxiliary dash-pot valves, as commonly provided in valves of the self-closing type. Consequently a simple inexpensive and yet efficient construction of means is provided by this invention for slowing the closing movement of self-closing valves against back pressure shock, etc., while at the same time eliminating the axial thrust of supply line pressure in opposition to opening movement of the movable valve structure.

We are aware that changes could be made in the constructions above set forth, and many apparently widely different embodiments of this invention could be made without departing from the scope thereof. It is therefore intended that all matter contained in the above description or shown in the accompanying drawings shall be interpreted as illustrative and not in a limiting sense.

We claim:

1. A valve of the kind described comprising a casing formed to provide intake and outlet chambers between which is a valve seat defining a valve port, a valve body cooperative with said valve seat and axially aligned with said valve port for movement toward and from the same within the casing intake chamber, an outwardly open dash-pot cylinder carried on the intake chamber facing side of said valve body so as to be movable therewith, a stationary plunger supported by the valve casing in aligned opposition to said dash-pot cylinder and entered in the outwardly open end portion thereof, a compression spring mounted between said plunger and the closed end of said dash-pot cylinder operative to move the latter and said valve body to valve port closing position, a thrust stud axially dependent from the outlet chamber facing side of said valve body, cam means cooperative with said thrust stud and operable from the exterior of said valve casing for manually moving the valve body to valve port opening position, guide ribs radial to said thrust stud and slidingly engaging the valve port periphery, and a single valveless liquid ingress and egress means extending from said dash-pot cylinder interior through one of said guide ribs for communication with the valve casing outlet chamber.

2. A valve of the kind described comprising a casing formed to provide an upper intake chamber and a lower outlet chamber between which is a valve seat defining a valve port, an upwardly opening valve body cooperative with said valve seat and axially aligned with said valve port, an upwardly open dash-pot cylinder carried on the upper side of said valve body so as to be movable therewith, a stationary plunger supported by the valve casing in aligned opposition to said dash-pot cylinder and entered in the upwardly open end portion thereof, a compression spring for moving said valve body and dash-pot cylinder to valve port closing position, a thrust stud axially dependent from the underside of said valve body, cam means cooperative with said thrust stud and operable from the exterior of said valve casing for manually moving the valve body to valve port opening position, guide ribs radial to said thrust stud and slidingly engaging the valve port periphery, and liquid ingress and egress means in communication between the interior of said dash-pot cylinder and the valve casing outlet chamber, said ingress and egress means comprising a passage including a liquid trapping section formed within one of said guide ribs.

3. A valve of the kind described comprising a casing formed to provide an upper intake chamber and a lower outlet chamber between which is a valve seat defining a valve port, an upwardly opening valve body cooperative with said valve seat and axially aligned with said valve port, an upwardly open dash-pot cylinder carried on the upper side of said valve body so as to be movable therewith, a stationary plunger supported by the valve casing in aligned opposition to said dash-pot cylinder and entered in the upwardly open end portion thereof, a compression spring for moving said valve body and dash-pot cylinder to valve port closing position, a thrust stud axially dependent from the underside of said valve body, cam means cooperative with said thrust stud and operable from the exterior of said valve casing for manually moving the valve body to valve port opening position, guide ribs radial to said thrust stud and slidingly engaging the valve port periphery, and liquid ingress and egress means in communication between the interior of said dash-pot cylinder and the valve casing outlet chamber, said ingress and egress means comprising a chamber formed within one of said guide ribs, a tubular duct leading from the bottom interior of said dash-pot cylinder downwardly into said chamber but terminating short of the bottom of the latter, and an outlet passage means also formed in said guide rib to lead from said chamber at a point substantially above the lower end of said duct.

HOWARD C. KRONE.
WILLIAM MEYER.